Oct. 20, 1959

G. S. CHERNIAK 2,909,739

TRANSDUCING DEVICES

Filed July 15, 1957

Inventor
George S. Cherniak
By Robert S. Topezer
Atty.

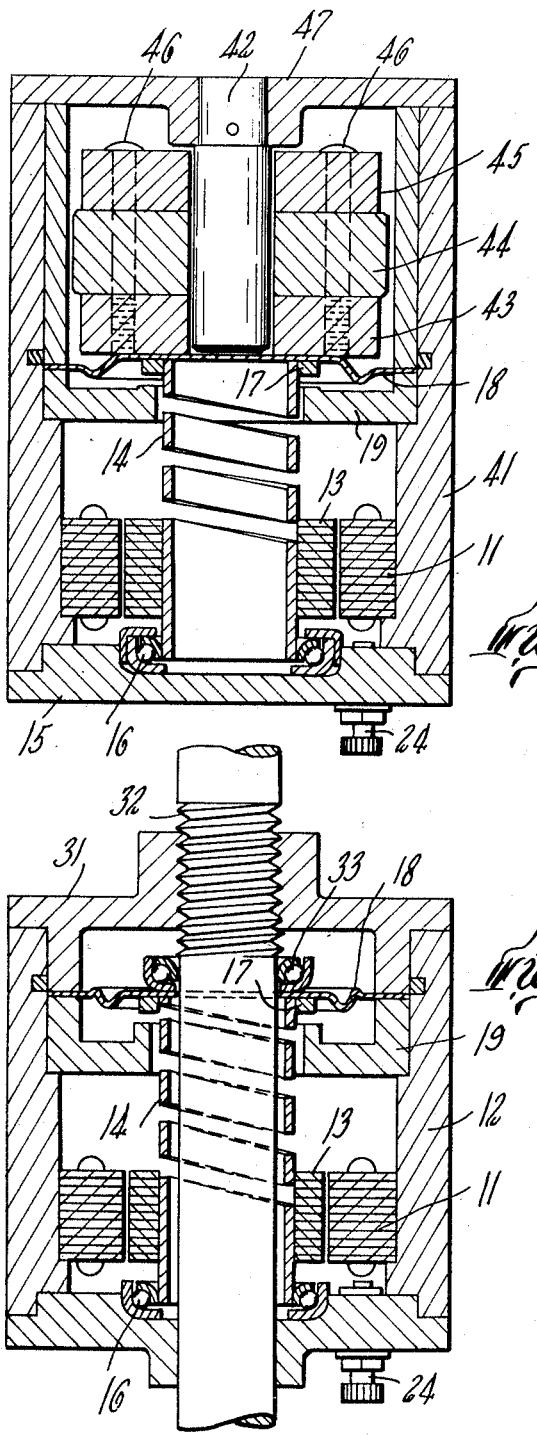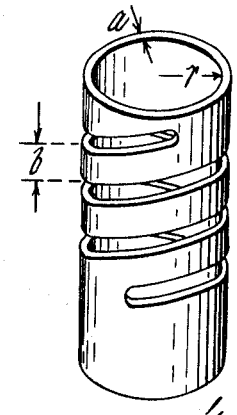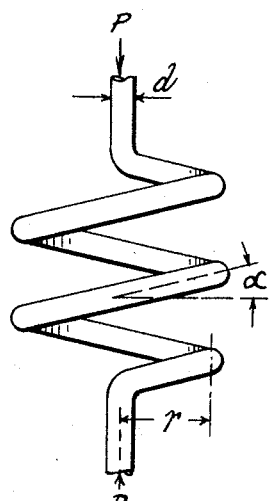

United States Patent Office 2,909,739
Patented Oct. 20, 1959

2,909,739
TRANSDUCING DEVICES

George S. Cherniak, Newton, Mass.

Application July 15, 1957, Serial No. 671,923

13 Claims. (Cl. 336—30)

This invention relates generally to the conversion of mechanical movements to representative electrical quantities and more particularly it relates to transducing devices for input variables which may be characterized in terms of physical displacements.

In recent years there have been developed to a highly refined state various types of electrical pickups whose function it is to translate physical quantities into corresponding electrical quantities. Notable among these is the rotary differential transformer which is adapted to provide electrical output signals of variable amplitude as a function of relatively small rotational movements. The attractive features of the rotary differential transformer are its high resolution and linearity, and its ability to produce amplitude variations of several volts per degree of angular displacement. It also has a relatively simple and compact construction wherein mechanical friction and wear are virtually nonexistent.

A problem is often presented in the application of devices of this kind, however, because of the limited range of input displacements to which they are adapted to respond under normal operating conditions. In the case of the rotary differential transformer a full scale angular displacement of approximately 3° is all that may be employed without departing to a substantial degree from a linear response characteristic. As is apparent, considerable difficulty is usually encountered when it is sought to provide for such small mechanical movements by conventional means, and as a result the applications of rotary differential transformers and the like have not been as extensive as would be expected if the facts were otherwise.

It is an object of the present invention therefore to provide a transducing device wherein translatory or linear movements are converted into relatively small angular displacements in an extremely simple and yet precise and accurate manner.

It is another object of the invention to provide in combination with a precision electrical pickup device, a more compatible actuating mechanism for operation in response to a variable physical quantity.

It is a further object of the invention to adapt a rotary differential transformer to use in the performance of various transducing functions characterized in terms of linear motion without recourse to the complex mechanical linkages which have been required hitherto to convert the linear motion to rotation.

The novel features of the invention, together with further of its objects and advantages, will become apparent from the several embodiments thereof shown in the accompanying drawings and described in the following. In the drawings:

Fig. 4 is a magnified cross-sectional view of a transducing device for a revolving shaft input in accordance with the invention;

Fig. 5 is a magnified cross-sectional view of a transducing device for mass accelerations in accordance with the invention; and Figs. 6 and 7 are perspective views of springs suitable for use in the transducing devices of the invention.

Figure 1:
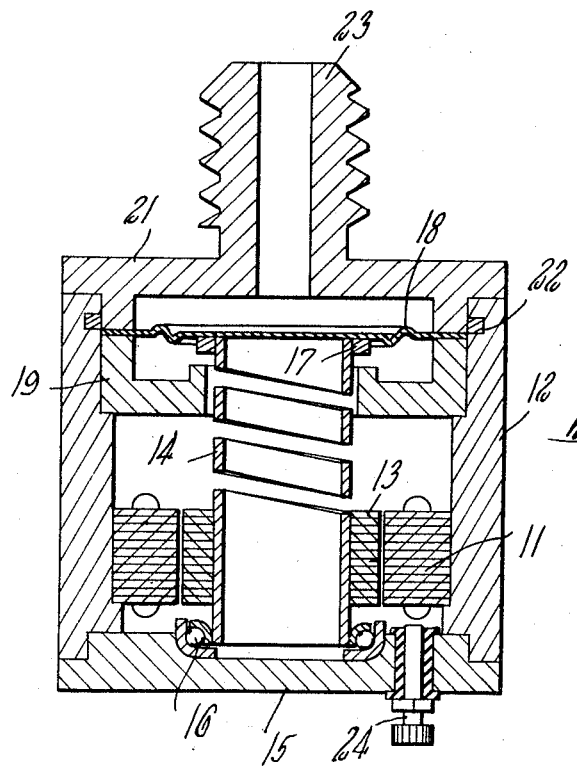
Fig. 1 is a magnified cross-sectional view of a transducing device for pressure fluids in accordance with the invention.

With reference now to the drawings, wherein like elements have been designated by the same reference characters, it will be observed that the transducing device of Fig. 1 includes a rotary differential transformer having a stator 11 rigidly mounted within a cylindrical housing 12, and a rotor 13 through which is passed one end of a helical spring 14. For optimum results the spring is preferably formed by the provision of a helical slot in a section of tubing, the slot being terminated short of the end portions of the tubing, as shown, to prevent the end turns from closing out, as will be discussed more fully hereinafter, and at the same time to provide at the one end of the spring a shaft-like mounting for the rotor 13. Any suitable means may be employed for affixing the rotor 13 to the spring 14 such as bonding by means of an epoxy resin or press fitting. Another arrangement that is frequently employed to mount the rotor of a rotary differential transformer is a conventional instrument clamping collar.

At the base of the housing 12 there is provided an end cap 15 adapted to retain an angular contact bearing 16 whose inner race supports the spring both axially and radially. The upper end of the spring is supported by means of a collar 17 and a membrane or diaphragm 18 disposed above the collar in face-to-face relation and being rigidly fastened thereto. By way of example, the material used for the diaphragm 18 may be beryllium copper in the order of five mils thick which in most applications will be sufficiently strong to withstand bursting and yet flexible enough in comparison to the stiffness of the spring so that its effect on the spring load-deflection characteristic will be relatively small. One advantage of beryllium copper is that it has low mechanical hysteresis but a disadvantage is its corrosiveness. When the transducer is subject to corosive atmospheres, therefore, a different material such as stainless steel is to be preferred.

To hold the diaphragm in place, the upper end of the housing 12 is adapted to receive a ridged ring or sleeve 19 to underlie the peripheral edge portions of the diaphragm and also an end cap 21 having a mating peripheral ridge in its lower face whereby the diaphragm is clamped down on the ring 19. The inner diameter of the ring 19 is made sufficiently large to provide adequate radial clearance for the spring 14 but not so large that the collar 17 does not encounter the ring when the spring has been deflected axially a predetermined amount corresponding to the load limit for which the spring has been designed. Thus it is seen that the ring 19 serves as a bumper or stop as well as a clamping element. It will be observed further that there is an interior groove 22 in the housing just above the plane of the diaphragm 18 which serves to hold an epoxy resin or other suitable sealant for the diaphragm so that the pressure fluid to which the device is responsive will be confined to the upper end of the housing. The pressure fluid is admitted to the upper end of the housing by way of a fluid coupling nipple 23 formed as an integral part of cap 21. Electrical connections to the rotary differential transformer are brought out at the lower end of the housing to suitable terminals 24.

The key to the operation of the transducing device of

Fig. 1 and for that matter all devices to be described herein lies in the spring 14 and more particularly its mode of support. That is to say, the upper end of the spring, which is acted upon by the diaphragm, is constrained to move axially while its lower end, which mounts the rotor of the rotary differential transformer, is constrained to rotate. Therefore, when the diaphragm is flexed and the spring is deflected axially as a result of a change in the pressure of the fluid admitted to the upper end of the housing, a corresponding angular displacement of the spring will occur causing the rotor 13 to assume a new angular position relative to the stator 11. If a typical spring be viewed from above, counterclockwise rotation of its lower end will be produced as a concomitant to compression by axial deflection of its upper end, and clockwise rotation will attend upward deflections thereof. By proper design of the spring in accordance with the principles to be outlined hereinafter, the amount of angular displacement produced under maximum load conditions can be made equal to approximately three degrees. Since the transformer itself is adapted to operate linearly within this limit, it follows that its response will likewise be in direct proportion to the load and hence to the operating pressure.

Figure 2:
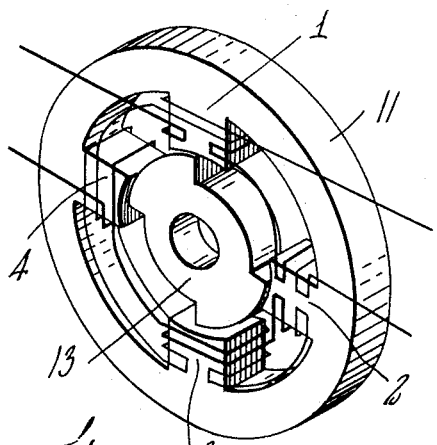
Fig. 2 is a magnified view in perspective of an elementary form of rotary differential transformer suitable for use in the transducing device of Fig. 1.

Since the makeup and properties of rotary differential transformers are fairly well known, only a brief description thereof will be given in connection with Figs. 2 and 3. With reference first to Fig. 2, there is shown in elementary form a four-pole rotary differential transformer whose stator and rotor are designated by the numerals 11 and 13, respectively, as was their designation in Fig. 1. The stator 11 is seen to consist of an annular core provided with radially inwardly projecting poles 1, 2, 3 and 4 which are symmetrically arranged about the core. Each pole carries a primary winding P1-4 and a secondary winding S1-4. The rotor 13 consists essentially of a ferromagnetic disc disposed concentrically within the stator and having one pair of opposite quadrants whose radial dimension is less than the other pair of quadrants.

Figure 3:
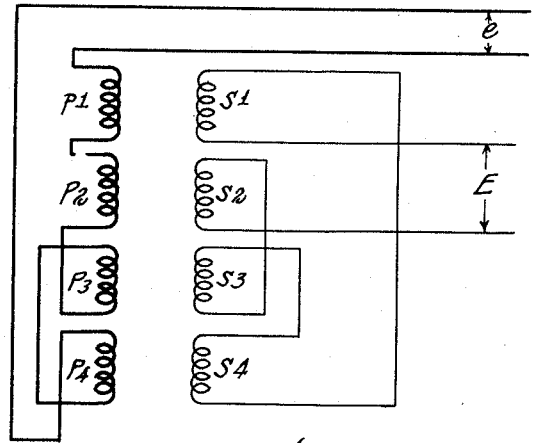
Fig. 3 is a schematic diagram to illustrate the interconnections of the windings of the rotary differential transformer in Fig. 2.

Fig. 3 illustrates schematically the connections for the primary and secondary windings. Thus, primary windings P1 and P2 on adjacent poles 1 and 2 are connected in series aiding relation which is likewise true of primary windings P3 and P4, but the combination of windings P1 and P2 is connected in series opposing relation to windings P3 and P4. In the case of the secondaries, windings S2 and S3 are connected in series aiding relation and so are S1 and S4, the series opposing pairs in this case comprising P2 and P3 on the one hand, and P1 and P4 on the other.

Owing to the special configuration of the rotor 13, its angular position will determine the amount of coupling between the primary and secondary windings. In particular, it can be shown that when an alternating voltage $e$ is applied across the primary circuit, a voltage $E$ is induced in the secondary circuit which increases with clockwise rotation of the rotor away from an initial zero voltage position, as illustrated in Fig. 2. Counterclockwise rotation of the rotor will likewise cause the amplitude of the output voltage to increase but in a phase reversed sense. According to the invention, however, the sense of the rotation need not be important because normally the no-load angular position of the spring will be arranged so as to correspond with the zero voltage position of the rotor, and the spring will be subject to compression only. It follows therefore that if the angular displacement of the spring is not more than approximately three degrees under maximum load or pressure, which is within the linear operating range of the rotary differential transformer as aforementioned, a proportionate relation will exist between the output voltage amplitude and the input variable pressure.

The rotary differential transformer may of course be embodied in a physical form different from the one shown, since the structural details of the transformer are for all practical purposes divorced from the basic design criteria according to the invention. For example, a rotary differential transformer having many more than four poles will be required where high accuracy is especially important so as to provide an output signal which will reflect extremely minute changes in the input variable. For a more complete description of rotary differential transformers and the forms which they may take reference may be had to "Instrument Engineering," volume 3, part 1, by C. S. Draper, W. McKay, and S. Lees, at page 632. It is likewise to be understood that other types of electrical pickups which are adapted for rotary actuation may be employed instead of a rotary differential transformer, provided of course that the range of angular displacements required in operation is limited to a few degrees. One example of such a pickup device might be a variable capacitor, and another a slug tuned variable inductor. Various devices of this kind will no doubt come to mind in connection with electrical systems which depend for their operation upon representative variations in some particular electrical quantity.

Fig. 4 illustrates a transducing device according to the invention which has particular utility in the field of servo systems where it is often necessary to provide an electrical output signal whose amplitude is under the control of a servo motor. With reference now to Fig. 4 it will be observed that in place of the end cap 21 of Fig. 1 there has been substituted an end cap 31 adapted to receive a threaded shaft 32. Also, suitable clearance holes have been provided in the diaphragm 18 and the lower end cap 15 for the shaft 32 which is seen to extend downwardly through the diaphragm and the spring with its lower end projecting from the end cap 15. Directly beneath its threaded portion there is mounted on the shaft 32 an angular contact bearing 33 having its outer face joined to the upper face of the diaphragm, and there is mounted on the spring the collar 17 to fasten the spring to the lower face of the diaphragm in like manner as in Fig. 1.

The operation of the transducing device of Fig. 4 differs from that described in connection with Fig. 1 only in regards to the manner in which spring 14 is actuated. In particular, when the upper end of the shaft is rotated in a clockwise direction, so that it is threaded into the end cap 31, the diaphragm and spring will be urged downwardly under the influence of the bearing 33. As a result the spring will be compressed, and owing to the fact that its lower end is constrained to rotate, a corresponding angular displacement of the spring will take place. Thus the amplitude of the output signal from the rotary differential transformer which has its rotor mounted on the lower end of the spring will reflect the extent of the rotary motion of the shaft. This mode of operation is particularly desirable in servo applications because wherever a servo motor is employed, ordinarily some means must be provided to translate a large number of shaft revolutions into a corresponding electrical signal. By means of the embodiment of Fig. 4, this function is performed in an extremely simple and straightforward manner whereby, in effect, relatively large angular displacements are converted into very small ones. To the extent that the amount of angular motion reduction provided in this way is insufficient, it will be understood, of course, that suitable gearing can be employed between the input shaft to the transducer and the output shaft of the servo motor or of whatever may be the rotary device to which the transducer is to respond. Another use to which the transducing device of Fig. 4 may be put is the measurement of lineal displacements. This is the reason why the input shaft has been extended entirely through the housing. For example, to gauge the size of an object, the lower end of the shaft may be employed as a feeler element in combination with a fixed feeler element (not shown) in the manner of a micrometer. The input variable in this case would then comprise, in effect, lineal displacement of the lower end of the shaft, and its rotational movement would be of importance only in so far as it is required to produce this lineal displacement. Thus, the upper end of the shaft might be turned by hand for example.

In Fig. 5 there is shown still another embodiment of the invention in the form of an accelerometer. In Fig. 5 a housing 41 is provided which extends upwardly for a substantial distance beyond the diaphragm to define a somewhat larger chamber than was present in Figs. 1 and 4. Within the chamber there is a vertical post 42 aligned with the spring 14 and carrying three washers 43, 44 and 45 which are assembled as a rigid unit by means of machine screws 46. The central washer 44 is of nylon and the other washers, which are responsible for most of the weight of the assembly, consist of some suitable heavy metal. The lowermost washer 43 is rigidly fastened to the diaphragm 18 and the post itself has its upper end rigidly mounted in an end cap 47 which is similar to end cap 21 of Fig. 1 except that its vertical dimension is increased to the extent required by the increased vertical dimension of the housing 41. Ample clearance is provided between the washers 43–45 and the post 42 so that the former will be permitted to move up and down only.

By now it will be apparent that it is the washers or weights in this case which cause the spring to deflect when the device is subject to accelerational forces, the amount of deflection produced being very nearly directly proportional to the amount of acceleration which the device is undergoing in an axial direction. Hence, the output signal from the rotary differential transformer will provide a measure of this acceleration. For damping purposes, the chamber above the diaphragm is filled with a suitable damping fluid such as a silicone oil, and the relatively small passages between the peripheries of the washers and the sleeve-like extension of the end cap 47 serve as damping gaps for the oil. In accordance with conventional practice, the central washer is made of nylon because it will expand radially under increased temperature conditions to effect a reduction of the gap along its length and thereby compensate for the decreased viscosity of the oil.

The first consideration is the design of a spring for use according to the invention will be the loading of the spring. A helical spring of circular or other cross-sectional wire, as shown in Fig. 6 can obviously be designed for the same loading as a spring of rectangular cross-section wire, and hence will be equally suitable in most respects. Since the former may be analyzed somewhat more simply from a mathematical standpoint, it will be treated first. Thus, the axial deflection $\delta$ of a round wire spring under conditions where one end of the spring is free to rotate with respect to the other is given by:

$$\delta = Pr^2 s \left[ \frac{\cos^2 \alpha}{GI_p} + \frac{\sin^2 \alpha}{EI} \right]$$

where
$d$ = wire diameter
$r$ = mean coil radius
$\alpha$ = coil pitch angle
$P$ = applied load
$\delta$ = deflection of spring
$\varphi$ = rotation of ends
$E$ = modulus of elasticity of spring material
$G$ = shear modulus of spring material
$I$ = moment of inertia of wire cross-section about wire diametrical axis
$I_p$ = polar moment of inertia of wire cross-section
$s$ = total length of spring wire
$n$ = number of turns Similarly the corresponding rotation $\varphi$ of one end of the spring with respect to the other is given by:

$$\varphi = sPr \sin \alpha \cos \alpha \left( \frac{1}{GI_p} - \frac{1}{EI} \right)$$

From the above it is evident that both $\delta$ and $\varphi$ are theoretically lineal functions of the applied load $P$ and can be calculated directly in terms of the physical constants which characterize the spring. The stress in the wire is calculated in the usual way:

$\sigma_{max}$ = maximum combined stress
$$= \frac{16Pr}{\pi d^3}(1 + \sin \alpha)$$

$\tau_{max}$ = maximum shearing stress
$$= \frac{16Pr}{\pi d^3}$$

In practice, helical springs of round wire are not perfectly linear, however, and the primary reason for this is that the wire diameter may not be uniform or the helix radius may vary due to manufacturing tolerances. Also, the number of active turns may vary when the spring is deflected due to closing up of the end turns or portions thereof. Springs of rectangular cross section wire, on the other hand, can be dimensionally compensated to avoid these conditions and this is the reason why they are preferred for use according to the invention. Another advantage of this preferred type of spring is that a greater amount of material may be employed for a given spring volume than is the case with round wire. This results in the material being stressed less for any given load, and with lower stresses, still further improvement will be realized from the standpoint of linearity and hysteresis. Accordingly, the above formulae have been suitably modified to cover the case of rectangular cross section wire and the results are as follows:

$$\delta = \frac{2\pi n Pr^3}{ba^3 \cos \alpha} \left[ \frac{\cos^2 \alpha}{\beta G} + \frac{12 \sin^2 \alpha}{E} \right]$$

$$= \frac{2\pi n Pr^3}{ba^3} \left[ \frac{\cos \alpha}{\beta G} + \frac{12 \sin \alpha \tan \alpha}{E} \right]$$

$$\varphi = \frac{2n Pr^2}{ba^3} \sin \alpha \left[ \frac{1}{\beta G} - \frac{12}{E} \right]$$

$$\tau_{max} = \frac{2Pr}{ba^2} \sqrt{9 \sin^2 \alpha + \frac{\cos^2 \alpha}{\alpha'}}$$

where
$a$ = thickness of wire
$b$ = width of wire
$\alpha$ and $\beta$ are constants which depend on the ratio $b/a$ In accordance with these formulae, it may be verified that a spring having the following physical characteristics will be suitable for use according to the invention assuming by way of example that the maximum load produced by the input variable is in the neighborhood of ten pounds.

$n$ = 4 turns
$r$ = .1475 inch
$a = b = .045$ inch
$E = 3 \times 10^7$ pounds per square inch
$G = E/3$
$\alpha = 7°40'$ Of course, the physical constants of the spring may vary considerably depending upon the particular application involved. In fact, it may be desirable in certain instances to employ more than one spring which may be accomplished without departing from the basic principles of operation according to the invention, since the functions of motion conversion and resiliency are basically distinct. Thus, if relatively heavy loading is to be applied, there is no need to compromise the design of the motion conversion spring by attempting to make it stiff. Rather auxiliary springs of conventional design can be provided for this purpose in parallel relation to the motion conversion spring. Also, series spring arrangements are possible so that it will be appreciated that the invention is by no means limited to the specific embodiments illustrated and described in detail. Rather the invention should be deemed to be limited only by the scope of the appended claims, and what is claimed is:

1. A transducing device for an input variable comprising a helical spring member having one of its ends constrained to move axially and the other of its ends restrained against axial and radial movement, a movable element acting on the axially movable end of said spring member and being adapted to cause axial deflection of said spring member as a function of the input variable, and an electrical pickup having a rotative part mounted on the axially restrained end of said spring member for angular movement therewith when said spring member is deflected axially and a relatively stationary part responsive to the angular displacement of said rotative part.

2. A transducing device for an input variable comprising a helical spring member having one of its ends constrained to move axially and the other of its ends restrained against axial and radial movement, a movable element acting on the axially movable end of said spring member and being adapted to cause axial deflection of said spring member as a function of the input variable, and an electrical pickup having a rotative part mounted on the axially restrained end of said spring member for angular movement therewith when said spring member is deflected axially and a relatively stationary part electrically coupled to said rotative part in accordance with the angular displacement of said rotative part.

3. A transducing device for an input variable comprising a helical spring member adapted to be deflected axially as a function of the input variable, means to restrain one end of said spring member against angular and radial movement, means to restrain the other end of said spring member against axial and radial movement, and an electrical pickup having a rotative part mounted on the axially restrained end of said spring member for angular movement therewith when said spring member is deflected axially and a relatively stationary part electrically coupled to said rotative part in accordance with the angular displacement of said rotative part.

4. A transducing device for an input variable comprising a helical spring member, a flexible element connected to one end of said spring member to cause axial deflection thereof as a function of said input variable while restraining said end against angular and radial movement, said flexible member having a relatively low stiffness in comparison to the stiffness of said spring member, means to restrain the other end of said spring member against axial and radial movement, and an electrical pickup having a rotative part mounted on the axially restrained end of said spring member for angular movement therewith when said spring member is deflected axially and a relatively stationary part electrically coupled to said rotative part in accordance with the angular displacement of said rotative part.

5. A transducing device for an input variable comprising a helical spring member, a diaphragm adapted to be deflected as a function of said input variable, said diaphragm being connected in face-to-face relation to one end of said spring member to cause a corresponding axial deflection thereof while restraining said end against angular and radial movement, means to restrain the other end of said spring against axial and radial movement, and an electrical pickup having a rotative part mounted on the axially restrained end of said spring member for angular movement therewith when said spring member is deflected axially and a relatively stationary part electrically coupled to said rotative part in accordance with the angular displacement of said rotative part.

6. A transducing device for an input variable comprising a cylindrical housing adapted at one end to receive said input variable, a helical spring member concentrically disposed within said housing, a diaphragm connecting one end of said spring member to said housing, said diaphragm being acted upon by said input variable to cause axial deflection of said spring member as a function of said input variable, means to restrain the other end of said spring member against axial and radial movement, and an electrical pickup having a rotative part mounted on the axially restrained end of said spring member for angular movement therewith when said spring member is deflected axially and a relatively stationary part electrically coupled to said rotative part in accordance with the angular displacement of said rotative part.

7. A transducing device for an input variable comprising a cylindrical housing adapted at one end to receive said input variable, a helical spring member concentrically disposed within said housing, said spring member consisting of a section of tubing having a helical slot formed therein, a diaphragm connecting one end of said spring member to said housing, said diaphragm being acted upon by said input variable to cause axial deflection of said spring member as a function of said input variable, a bearing to restrain the other end of said spring member against axial and radial movement and an electrical pickup having a rotative part coaxially joined to the axially restrained end of said spring member for angular movement therewith when said spring member is deflected axially and a relatively stationary part rigidly mounted within said housing and being electrically coupled to said rotative part in accordance with the angular displacement of said rotative part.

8. A transducing device for an input variable comprising a helical spring member having one of its ends constrained to move axially and the other of its ends restrained against axial and radial movement, a movable element acting on the axially movable end of said spring member and being adapted to cause axial deflection of said spring member as a function of said input variable, and an electrical pickup having a ferromagnetic part mounted on the axially restrained end of said spring member for angular movement therewith when said spring member is deflected axially and a relatively stationary part inductively coupled to said ferromagnetic part in accordance with the angular displacement of the latter.

9. A transducing device for an input variable comprising a helical spring member having one of its ends constrained to move axially and the other of its ends restrained against axial and radial movement, a movable element acting on the axially movable end of said spring member and being adapted to cause axial deflection of said spring member as a function of said input variable, and a rotary differential transformer having a rotor and a stator, said rotor being rigidly joined to the axially restrained end of said spring member for angular movement therewith when said spring member is deflected axially and said stator being inductively coupled to said rotor in accordance with the angular displacement of said rotor.

10. A pressure transducer comprising a helical spring member having one of its ends constrained to move axially and the other of its ends restrained against axial and radial movement, a pressure sensitive diaphragm acting on the axially movable end of said spring member and being adapted to cause axial deflection of said spring member as a function of a fluid pressure, and a rotary differential transformer having a rotor and a stator, said rotor being rigidly joined to the axially restrained end of said spring member for angular movement therewith when said spring member is deflected axially and said stator being inductively coupled to said rotor in accordance with the angular displacement of said rotor.

11. A transducing device for shaft rotational movements comprising a helical spring member having one of its ends constrained to move axially and the other of its ends restrained against axial and radial movement, a screw operatively connected to the shaft and being adapted to act upon the axially movable end of said spring member so as to cause axial deflection thereof corresponding to the threaded advance of the screw, and a rotary differential transformer having a rotor and a stator, said rotor being rigidly joined to the axially restrained end of said spring member for angular movement therewith when said spring member is deflected axially and said stator being inductively coupled to said rotor in accordance with the angular displacement of said rotor.

12. An accelerometer comprising a helical spring member having one of its ends constrained to move axially and the other of its ends restrained against axial and radial movement, an element of mass acting on the axially movable end of said spring member and being constrained to move in the same axial direction thereas in response to mass accelerations in said direction, and a rotary differential transformer having a rotor and a stator, said rotor being rigidly joined to the axially restrained end of said spring member for angular movement therewith when said spring member is deflected axially and said stator being inductively coupled to said rotor in accordance with the angular displacement of said rotor.

13. A transducing device for an input variable comprising a helical spring member with coil elements of rectangular cross-section, said member having one of its ends constrained to move axially and the other of its ends restrained against axial and radial movement and free for rotational movement, a movable element acting on the axially movable end of said spring member for causing axial deflection of said coil elements as a function of the input variable and for causing rotational movement of said axial restrained end of said spring member as a linear function of the deflection of said coil elements, an electrical pickup having a rotative part supported by and mounted on the axially restrained end of said spring member and rotatively movable therewith, and a relatively stationary part to produce an output signal which is a linear function of the rotation of said rotative part.

References Cited in the file of this patent

UNITED STATES PATENTS

| | | |
|---|---|---|
| 2,564,669 | Brady | Aug. 21, 1951 |
| 2,748,355 | Jarvis | May 29, 1956 |
| 2,788,665 | Wiancko | Apr. 16, 1957 |

FOREIGN PATENTS

| | | |
|---|---|---|
| 509,626 | Canada | Feb. 1, 1955 |

UNITED STATES PATENT OFFICE

Certificate of Correction

Patent No. 2,909,739

October 20, 1959

George S. Cherniak

It is hereby certified that error appears in the printed specification of the above numbered patent requiring correction and that the said Letters Patent should read as corrected below.

Column 5, line 41, for "is the" read —in the—; column 6, lines 37 to 39, the formula should appear as shown below instead of as in the patent:

$$\varphi = \frac{2\pi n P r^2}{b a^3} \sin \alpha \left[ \frac{1}{\beta G} - \frac{12}{E} \right]$$

same column 6, line 46, for "α and β" read —α' and β—.

Signed and sealed this 7th day of June 1960.

[SEAL]

Attest:
KARL H. AXLINE,
*Attesting Officer.*

ROBERT C. WATSON,
*Commissioner of Patents.*